United States Patent
Jang et al.

[11] Patent Number: 6,028,896
[45] Date of Patent: Feb. 22, 2000

[54] METHOD FOR CONTROLLING DATA BIT RATE OF A VIDEO ENCODER

[75] Inventors: Seong Hwan Jang; Soon Hwa Jang, both of Taejeon, Rep. of Korea

[73] Assignee: Korea Telecommunication Authority, Seoul, Rep. of Korea

[21] Appl. No.: 08/948,932

[22] Filed: Oct. 10, 1997

[30] Foreign Application Priority Data

Oct. 11, 1996 [KR] Rep. of Korea ................. 96-45248

[51] Int. Cl.$^7$ ................................. H04N 7/18
[52] U.S. Cl. .............. 375/240; 382/239; 382/236; 382/251; 370/537; 370/540
[58] Field of Search ................. 348/404, 405, 348/415, 560, 423, 419

[56] References Cited

U.S. PATENT DOCUMENTS

| | | |
|---|---|---|
| 5,526,054 | 6/1996 | Greenfield et al. |
| 5,532,746 | 7/1996 | Chang ........................ 348/415 |
| 5,680,483 | 10/1997 | Tranchard ................. 348/405 |
| 5,686,963 | 11/1997 | Uz et al. .................. 348/404 |
| 5,877,814 | 3/1999 | Reininger et al. ........ 348/500 |

*Primary Examiner*—Andy Rao
*Assistant Examiner*—Shawn S. An
*Attorney, Agent, or Firm*—Merchant & Gould P.C.

[57] ABSTRACT

A method for controlling the data bit rate of a differential pulse code modulation/discrete cosine transform (DPCM/DCT) video encoder, which is adapted to achieve a bit rate control in accordance with a video signal band compression scheme using a differential pulse code modulation (DPCM) and a discrete cosine transform (DCT), thereby obtaining a supreme picture quality while preventing a buffer overflow or underflow phenomenon from occurring in the encoder. The method includes the steps of determining an initial bit allocation amount for every group of pictures (GOP) of an input video, allocating bits for every picture of each GOP, allocating bits for every macroblock of each picture, determining a quantizer step parameter based on the bit allocation amount, and determining a quantizer step size proportional to the determined quantizer step parameter.

6 Claims, 4 Drawing Sheets

METHOD FOR CONTROLLING DATA BIT RATE OF A VIDEO ENCODER

BACKGROUND OF THE INVENTION

1. Field of the Invention

The present invention relates to a method for controlling the data bit rate of a video encoder, and more particularly to a method for controlling the data bit rate of a differential pulse code modulation/discrete cosine transform (DPCM/DCT) video encoder, which is adapted to achieve a bit rate control in accordance with a video signal band compression scheme using a differential pulse code modulation (DPCM) and a discrete cosine transform (DCT), thereby obtaining a supreme picture quality while preventing a buffer overflow or underflow phenomenon from occurring in the encoder.

2. Description of the Prior Art

The DPCM/DCT scheme is a video signal band compression scheme which is most commonly used. The MPEG-1, MPEG-2 and H.261, which are digital video data compression standards proposed by international standardization organizations, namely, the ISO/IEC and ITU-T, use the DPCM/DCT scheme. Since the demand for digital video services is increasing, the demand for DPCM/DCT codec (coder/decoder) using the above-mentioned standards will increase abruptly in future. An algorithm for controlling the data bit rate of a video encoder has also been proposed which is capable of obtaining a supreme picture quality while preventing a buffer overflow or underflow phenomenon from occurring in the encoder. This algorithm is an important technique in determining the performance of encoders irrespective of the above-mentioned standards.

The DPCM/DCT video signal band compression method removes a redundancy in video signals. This method utilizes the property that there is much redundancy among video signals in terms of space and time. In order to remove a spatial redundancy in video signals, each video is divided into a plurality of blocks (for example, 8×8 blocks) which are, in turn, subjected to a two-dimensional DCT. The resultant data, namely coefficients are obtained after the two-dimensional DCT are distributed in accordance with different frequency components. In most cases, video data contains a large number of low-frequency components. Accordingly, video blocks processed by the DCT exhibit an energy distribution in such a manner that a large level of energy is distributed at the coefficients associated with the low-frequency components. Meanwhile, the organ of vision of the human being is insensitive to high-frequency components of video. Accordingly, when transmission of a video is carried out in such a manner that only the low-frequency components of the video are transmitted while the high-frequency components of the video are eliminated as much as possible, a high data compression effect can be obtained. The removal of a spatial redundancy in successive videos may be achieved by finding a macroblock (16×16 pixels) from one of the previous videos most similar to the macroblock of the current video, calculating the difference between the two macroblocks, and transmitting only the calculated difference value and vectors respectively indicating the positions of the macroblocks. In the case of the vectors, only the difference between those vectors is transmitted. In this case, a high data compression effect is obtained. It is also possible to obtain a high data compression effect by coding values, frequently used, by codes of short length for values while coding values, rarely used, by codes of long length. The standards using the DPCM/DCT such as MPEG and H.121 stipulate the above-mentioned compression algorithms, a variety of variable length codes and a syntax for the transmission of those codes.

The DPCM/DCT video signal band compression method uses two video coding modes, namely, an intra mode (I mode) and a predictive mode (P mode). In the I mode, video data is processed in accordance with DCT in order to remove a spatial redundancy for every block in the video data. The resultant DCT coefficients are quantized and then transmitted. The P mode is adapted to remove a time redundancy between successive videos. The motion vector of the previous video's macroblock, most similar to that of the current video, is found. The difference between the found macroblocks is processed by DCT. The resultant DCT coefficient is quantized and then transmitted along with a vector. This P mode is carried out for every macroblock. In the I mode, the information of a video is transmitted without any variation. Accordingly, the data transmitted in the I mode can always be decoded because a random access thereto is always possible. In the P mode, however, a motion compensation of the current video from the previous video is carried out. Accordingly, a reference picture is essentially required upon decoding the data transmitted in the P mode. Even in the P video mode, macroblocks found as having no similar portion to those of the previous video are transmitted in the I mode. In MPEG-2, the unit of randomly accessible video data is defined as a group of pictures (GOP). The first picture of a GOP is coded in the I mode because it requires no reference picture. The remaining pictures of the GOP are coded in the P mode. Generally, the bit amount of bit streams produced for I-mode pictures is considerably greater than that of the P-mode pictures (about 3 times) when the same picture quality is obtained. In that regard, a higher data compression effect is obtained after a motion compensation is carried out. The bit amount of bit streams produced in the encoding operation varies greatly, depending on the characteristics of an input video and the coding mode used. In order to transmit amount-variable bit streams in a constant bit rate, buffers should be provided for both the encoder and decoder respectively, thereby reducing the difference between the encoder's data production amount and the transmission capacity given. In this case, the encoder should also be controlled so that the production rate of bit streams corresponds to the transmission capacity, thereby preventing an overflow or underflow state of the buffer. This control is called a "bit rate control". For such a bit rate control, it is effective to carry out a bit allocation for data to be coded while taking into consideration the transmission capacity, and to control generation of bits in such a manner that the amount of generated bits corresponds to the amount of allocated bits. The bit amount of a bit stream generated is controlled by the step size of a quantizer. An increase in the step size of the quantizer results in an increase in the loss of quantized data. In this case, the amount of generated bits is reduced, even though the picture quality is degraded. A reduced step size of the quantizer results in an increase in the amount of generated bits, even though a better picture quality is obtained. Therefore, the bit rate control is directly connected with the picture quality of decoded videos. Since there is no standard for such a bit rate control, different bit rate control methods may be applied to encoders having different configuration, respectively. The performance of an encoder also depends on the bit rate control used.

In the conventional bit rate control algorithm for DPCM/DCT video encoders, a method is mainly used in which the step size of the quantizer used is simply determined in such a manner that is proportional to the fill capacity of the buffer used. A method is also used in which the complexity of an input video is calculated so that bits are allocated in proportion to the calculated complexity. Although the method, which takes into consideration only the fill capacity of the buffer used, uses a simple algorithm and a simple circuit configuration, it is ineffective because a severe variation in the picture quality occurs. On the other hand, the method involving a calculation of the complexity of an input video should use a complex algorithm and a complex circuit configuration.

SUMMARY OF THE INVENTION

Therefore, an object of the invention is to solve the above-mentioned problems and to provide a method for controlling the data bit rate of a DPCM/DCT video encoder, which uses a simple algorithm involving no calculation of the complexity of an input video while obtaining a similar picture quality to those obtained by algorithms involving the complexity calculation, thereby enabling the encoder to exhibit a superior performance.

In accordance with the present invention, this object is accomplished by providing a method for controlling the data bit rate of a differential pulse code modulation/discrete cosine transform (DPCM/DCT) video encoder, comprising the steps of: determining an initial bit allocation amount for every group of pictures (GOP) of an input video; allocating bits for every picture of each GOP; allocating bits for every macroblock of each picture; determining a quantizer step parameter based on the bit allocation amount; and determining a quantizer step size proportional to the determined quantizer step parameter.

BRIEF DESCRIPTION OF THE DRAWINGS

Other objectives and aspects of the invention will become apparent from the following description of embodiments with reference to the accompanying drawings in which.

DETAILED DESCRIPTION OF THE PREFERRED EMBODIMENTS

Figure 1:
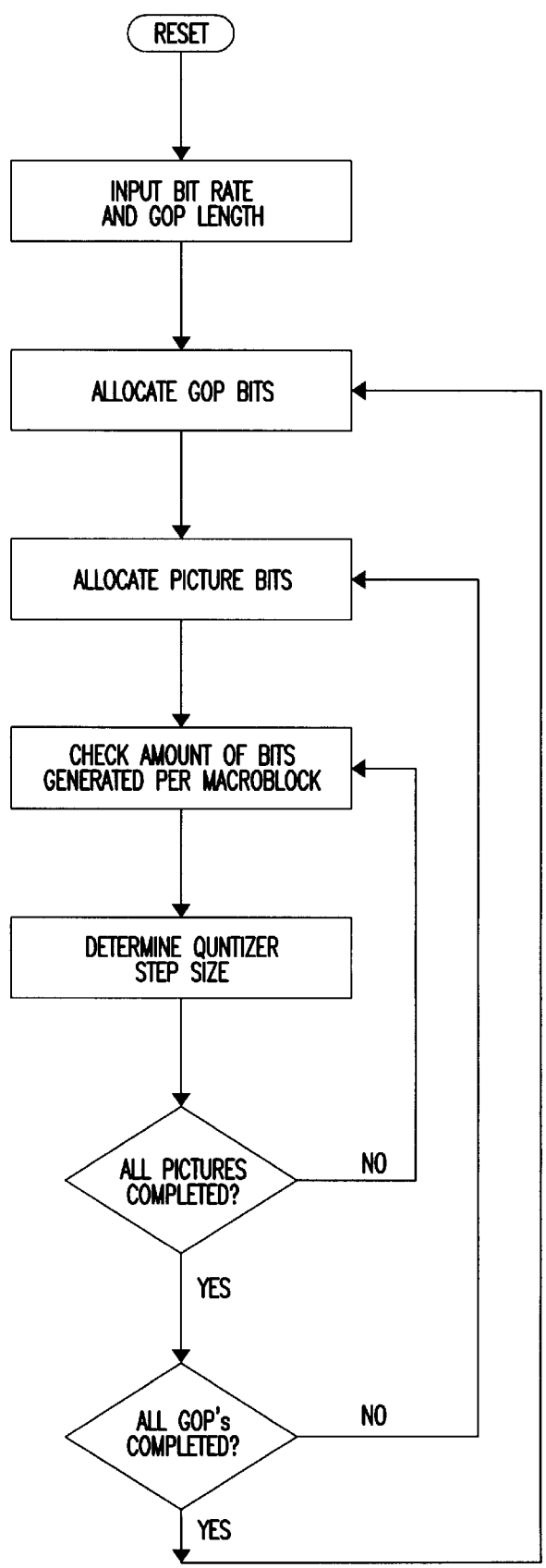
FIG. 1 is a flow chart illustrating a bit rate control according to the present invention.

For an effective bit rate control, it is necessary to appropriately allocate bits to every unit of video data to be coded while taking into consideration a transmission capacity given, and to generate bits in the same amount as the allocated bits. The bit allocation is executed in the order starting from the greatest unit of video data to be coded and terminating to the smallest unit of video unit to be coded, for example, in the order of GOP, picture and macroblock. The bit allocation amount for the greatest coding unit, namely, GOP's, corresponds to a transmission capacity given. For the coding units smaller than the GOP unit, the bit allocation amounts thereof are determined by appropriately dividing the bit allocation amounts for greater-order coding units associated therewith. That is, the present invention provides a method for controlling the data bit rate of a DPCM/DCT video encoder, comprising the steps of determining an initial bit allocation amount for every group of pictures (GOP) of an input video; allocating bits for every picture of each GOP, allocating bits for every macroblock of each picture, determining a quantizer step parameter based on the bit allocation amount, and determining a quantizer step size proportional to the determined quantizer step parameter.

Initial bit allocation amounts for GOP's, which are of the greatest coding unit, are uniformly allocated in accordance with the transmission capacity given. That is, the initial bit allocation amount for a GOP is derived on the basis of the transmission capacity bit_rate, the number of frames transmitted per second, frame_rate, and the number of pictures in a GOP, nPinGOP, as illustrated in the following equation (1):

$$TGOP = nPinGOP \cdot (bit\_rate/frame\_rate) \quad (1)$$

After the coding of one GOP is completed, the difference between the amount of bits, TGOP, allocated to the GOP and the amount of bits, B, actually generated is calculated. In order to prevent the amount of bits generated in every coding operation from exceeding the transmission capacity, the calculated bit amount difference is added to the initial bit allocation amount, TGOP', of a GOP following the coded GOP. That is, the initial bit allocation amount TGOP' of the next GOP is derived as in the following equation (2):

$$TGOP' = nPinGOP \cdot (bit\_rate/frame\_rate) + (TGOP - B) \quad (2)$$

Since the bit allocation amount of each GOP corresponds to the given transmission capacity, every picture of each GOP is allocated with an amount of bits determined by appropriately dividing the bit allocation amount of the GOP. The bit allocation for pictures of a GOP is carried out, taking into consideration the number of pictures in the GOP and the coding mode used. I-mode pictures should be allocated with a larger amount of bits than that allocated for P-mode pictures. This is because I-mode pictures generally exhibit a high bit generation rate as compared to P-mode pictures. In other words, I-mode pictures should be allocated with a larger amount of bits than that allocated for P-mode pictures in order to make the pictures of each GOP have a uniform picture quality. The reason why I-mode pictures should be allocated with a larger amount of bits than that allocated for P-mode pictures is because I-mode pictures are used as a reference picture for a motion compensation for P-mode pictures following them. In other words, I-mode pictures should have a good picture quality in order to achieve a more efficient band compression.

When "TI" and "TP" represent the bit allocation amounts for I and P-mode pictures, respectively, they are determined in such a manner that "TI" corresponds to 3 times "TP". The "3 times" is a value statistically determined after a number of simulated tests. That is, "TI" and "TP" are derived as in the following equations (3) and (4):

$$TI=3 \cdot TGOP/(nPinGOP+2) \quad (3)$$

$$TP=(TGOP-B)/nPinGOP'=R/nPinGOP' \quad (4)$$

In Equation (4), "B" represents the amount of bits generated during a decoding operation for pictures of a GOP after the decoding operation for the GOP begins, and "nPinGOP'" represents the number of pictures not yet decoded (namely, to be decoded) in the GOP being decoded.

In connection with this, minimum amounts of bits $minT_I$ and $minT_P$ for I and P-mode pictures are also derived as in the following equations (5) and (6):

$$minT_I=\text{bit-rate}/8 \cdot 30 \quad (5)$$

$$minT_P=\text{bit rate}/16 \cdot 30 \quad (6)$$

When "TI" is less than "$minT_I$", it is set by "$minT_I$". Also, "TP" is set by "$minT_P$" when it is less than "$minT_P$". The values $minT_I$ and $minT_P$ are experimentally determined in such a manner that they are proportional to a transmission capacity given, as shown in Equations (5) and (6). The reason why the values $minT_I$ and $minT_P$ should be proportional to the transmission capacity is because the buffer size, delay and picture quality depend on the transmission capacity.

The bit allocation amount for a macroblock, TMB, is derived by uniformly dividing the bit allocation amount for a picture by the number of macroblocks in the picture, nMPinP, as expressed by the following equation (7):

$$TMB = \begin{cases} TI/nMBinP \\ TP/nMBinP \end{cases} \quad (7)$$

Since the step size of the quantizer used can be determined for every macroblock, the bit rate is controlled by comparing the bit allocation amount for every macroblock with the amount of actually generated bits for the macroblock, thereby varying the step size of the quantizer. For such a variation in the step size of the quantizer, it is required to use a parameter to which the step size variation is proportional. The following equation (8) is an equation for deriving the parameter for adjusting the step size of the quantizer:

$$d_j=d_o+\Sigma B_j-\Sigma TMB_j \quad (8)$$

where, "$d_j$" represents a parameter value of the j-th macroblock, "$d_0$" represents an initial value of "$d_j$", "$\Sigma B_j$" represents the accumulated amount of bits generated for up to the j-th macroblock, and "$\Sigma TMB_j$" represents the accumulated amount of bits allocated for up to the j-th macroblock.

The step size of the quantizer is proportional to the parameter value $d_j$. Accordingly, as the accumulated amount of bits, $\Sigma B_j$, generated for up to the current macroblock is more than the accumulated amount of bits, $\Sigma TMB_j$, allocated for up to the current macroblock, the parameter value $d_j$ increases. In this case, accordingly, the step size of the quantizer also increases. The increased step size of the quantizer results in a decrease in the amount of generated bits. On the contrary, as the accumulated amount of bits, $\Sigma B_j$, generated for up to the current macroblock is less than the accumulated amount of bits, $\Sigma TMB_j$, allocated for up to the current macroblock, the parameter value $d_j$ decreases. In this case, accordingly, the step size of the quantizer also decreases. The decreased step size of the quantizer results in an increase in the amount of generated bits. The following equations (9) and (10) are equations for deriving the step size $Q_j$ of the quantizer for the j-th macroblock by use of the parameter value $d_j$:

$$Q_j=31 \cdot d_j/r \quad (9)$$

$$r=\text{buffer\_size}/8 \quad (10)$$

Equation (9) means that when "$d_j$" corresponds to "r", it is intended to set the step size of the quantizer by "31". In the case of standards such as MPEG and H.126, the maximum step size of the quantizer is "31". In Equation (10), "buffer size" represents the size of a buffer used. The value "r" is a value for determining a variation rate of the step size of the quantizer. Where the value "r" is less, the amount of generated bits is more rapidly astringed to the amount of allocated bits because the step size of the quantizer responds more sensitively to a variation in the value $d_j$. In this case, however, the step size of the quantizer varies too frequently. At a greater value of "r", the amount of generated bits is more slowly astringed to the amount of allocated bits. In this case, accordingly, the variation rate of the step size of the quantizer is reduced. Equation (10) means that the value "r" is set to be proportional to the buffer size of the encoder. The reason why the value "r" is set to be proportional to the buffer size of the encoder is because there is a higher probability of the overflow phenomenon at a reduced buffer size. In other words, it is important that the value "r" is rapidly astringed to the amount of allocated bits, not to the picture quality. The following equation (11) expresses an initial value $d_0$ of the parameter value $d_j$:

$$d_0=10 \cdot r/31 \quad (11)$$

Equation (11) defines "$d_0$" so that the initial step size of the quantizer corresponds to "10". After all macroblocks of one picture are coded, "$\Sigma TMB_j$" corresponds to the bit allocation amount for the picture. In this state, accordingly, "$\Sigma B_j$" approximates to the bit allocated amount for the picture. The parameter value $d_j$ for the last macroblock of one picture is used as an initial parameter value $d_0$ for a picture following the former picture. In this case, "$\Sigma B_j$" is also reset to "0".

Preferably, the buffer size corresponds to 1/10 of the transmission capacity. It is also set that an overflow alarm is generated at 9/10 of the buffer size while an underflow alarm is generated at 1/10 of the buffer size. When an underflow alarm is generated, the encoder sets the step size of the quantizer to a minimum value, namely, "1", and performs a bit stuffing operation. On the other hand, when an overflow alarm is generated, the encoder sets the step size of the quantizer to a maximum value, namely, "31". If necessary, the quantizer controls all AC components of DCT coefficients output therefrom to be "0", except for about 3 AC components left in a zig-zag manner. In the case of a field picture coding, the number of pictures in each GOP increases double. In this case, the buffer size and the underflow/overflow values are reduced by ½.

Now, circuits for calculating bit allocation amounts for the above-mentioned coding units in accordance with the present invention will be described.

These circuits are connected to a DPCM/DCT video encoder according to MPEG. For these circuits, reset clock, GOP clock, picture clock, macroblock clock, amount of generated bits, bit rate, and value indicative of the number of pictures in a GOP are used as input signals. For every macroblock, a signal indicative of the step size of the quantizer and overflow/underflow alarms are output. The GOP clock, bit rate, number of pictures in GOP's and frame field picture select signal should be input for every GOP. The picture clock is input for every picture whereas the macroblock clock and amount of generated bits are input for every macroblock. The GOP clock, picture clock and macroblock clock are clocks informing of the beginning of a GOP, a picture and a macroblock, respectively. These clocks should be maintained at a level of "1" for every interval of a system clock, namely, a period between descending edges of successive system clocks.

Figure 2:
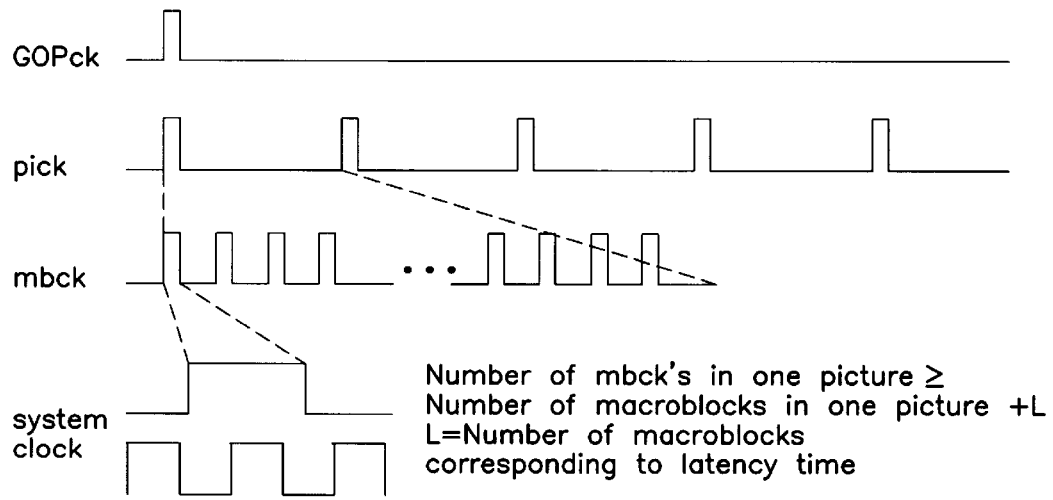
FIG. 2 is a timing diagram illustrating a variety of clocks generated for the bit rate control according to the present invention.

FIG. 1 is a flow chart illustrating a bit rate control according to the present invention whereas FIG. 2 is a timing diagram illustrating a variety of clocks generated for the bit rate control according to the present invention. The encoder can not complete the processing of one macroblock of a picture within a period corresponding to a macroblock interval because filtering, motion compensation, DCT, quantization and mode calculations, etc. are involved in the processing of one macroblock. Accordingly, it is necessary to provide a latency time for processing the above-mentioned calculations. In this regard, the number of macroblock clocks generated within a picture clock interval should be equal to or more than a value obtained by adding the number of macroblocks corresponding to the latency time to the number of macroblocks in one picture. For this reason, data about the quantizer step size associated with the first macroblock should not be output in sync with the first macroblock clock. This data should be output in sync with a macroblock clock generated at the point of time when macroblock data is input at the quantizer after being processed for motion compensation and DCT. Therefore, calculations of the GOP bit allocation amount and picture bit allocation amount are carried out in the first latency period.

Figure 3:
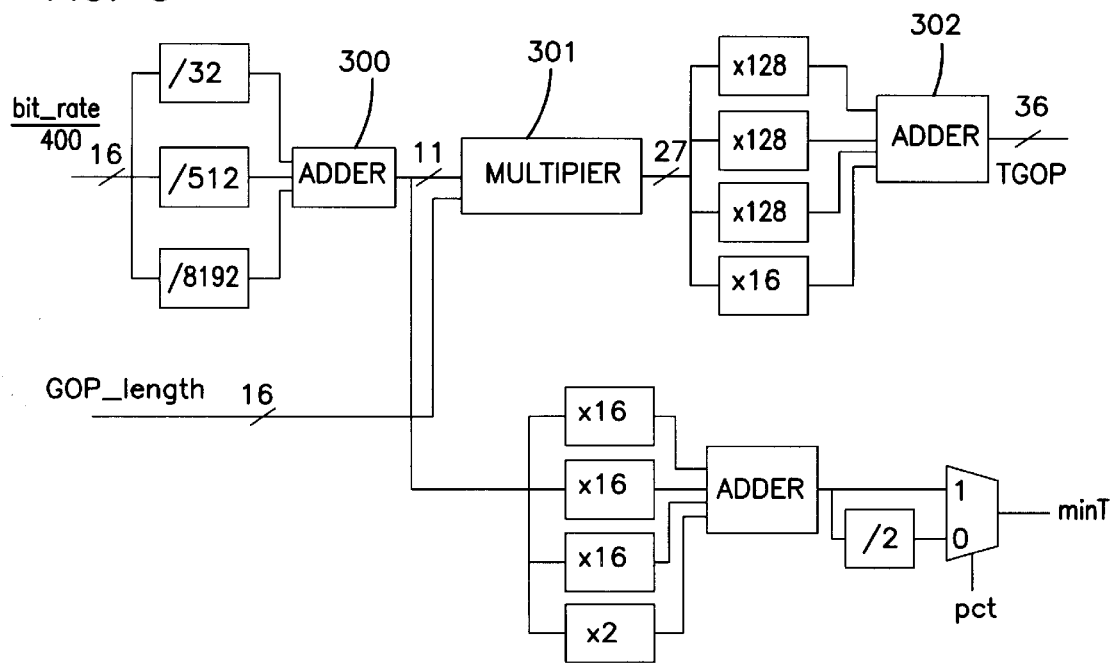
FIG. 3 is a block diagram illustrating a circuit for deriving the bit allocation amount for a GOP in accordance with the present invention.

FIG. 3 is a block diagram illustrating a circuit for deriving an initial GOP bit allocation amount TGOP by use of Equation (1) in accordance with the present invention. In the illustrated case, "frame_rate" is set to "30" whereas "bit_rate" is set to 1/400 minute. The reason why "bit_rate" is set to 1/400 minute is because the bit_rate stipulated in the MPEG syntax is 1/400 minute. The division of "bit_rate" by "30" is carried out by dividing "bit rate" by multiples of 2, namely, "32", "512" and "8192", respectively, and then inputting the division results at an adder 300, thereby obtaining an approximate sum. The division by multiples of 2 can be accomplished by use of simple hardware because it requires only a bit cutting operation. The result obtained after the division should be multiplied by an input GOP length, namely, "nPinGOP", in a multiplier 301. The multiplier 301 is a general 16×16 multiplier. The result of the multiplication executed in the multiplier 301 should be then multiplied by "400". This multiplication is carried out by multiplying the output from the multiplier 301 by multiples of 2, namely, "16" and "128". In the illustrated case, this multiplication is carried out, using a ×16 multiplier and three ×128 multipliers. The multiplication by "16" and "128" can be simply accomplished because it requires only a suffixing of 0. The above-mentioned TGOP calculation is carried out in the latency time for every macroblock. The TGOP value is maintained so long as the input value has no variation. Accordingly, the calculated TGOP value is latched so that it is maintained. As a result, there is no time limitation due to the TGOP calculation. In FIG. 3, "pct" represents a minimum amount of I-mode picture bits $minT_I$ when it corresponds to "1" and a minimum amount of P-mode picture bits $minT_P$ when it corresponds to "0".

Figure 4:
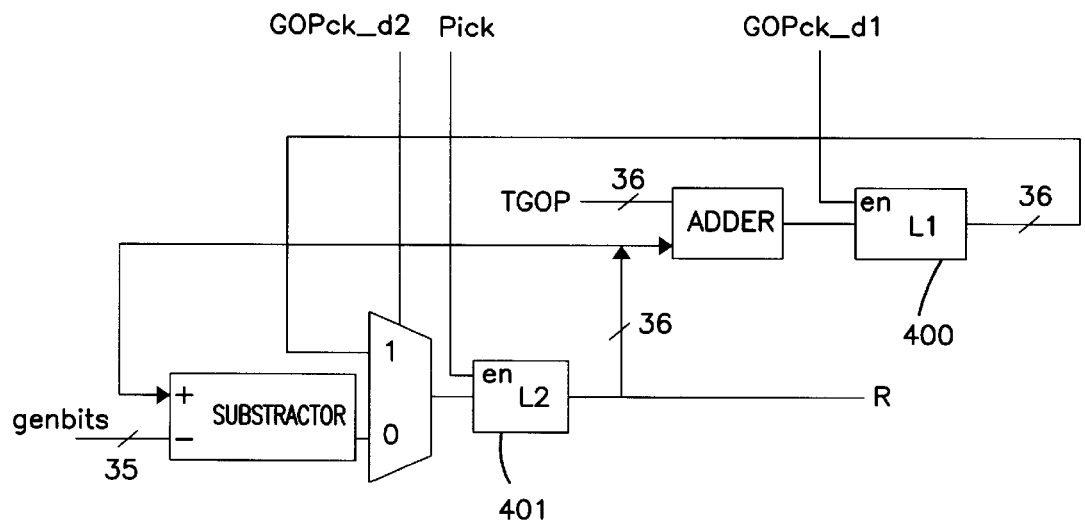
FIG. 4 is a block diagram illustrating a circuit for calculating those of bits initially allocated to a GOP while remaining after processing every picture of the GOP in accordance with the present invention.

FIG. 4 is a block diagram illustrating a circuit for calculating those bits initially allocated to a GOP while remaining after processing every picture of the GOP in accordance with the present invention. The number of remaining bits, R, is calculated by subtracting the number of generated bits from "TGOP" after processing every picture. The value R obtained after completing the coding operation for one GOP may be positive or negative. When a coding operation is started for a GOP following the current GOP, the value R obtained after completing the coding operation of the current GOP is added to an initial bit allocation amount for the next GOP, in order to compensate for an excessive or insufficient portion of actually generated bits for the GOP. The value R corresponds to "0" in a reset state. In FIG. 4, the reference numerals 400 and 401 respectively corresponding to reference characters L1 and L2 denote latches, respectively. These latches L1 and L2 are reset to "0" by reset signals applied thereto, respectively. The latch L1 is enabled by an enable signal GOPck_d1 which is delayed from the GOP clock by one clock. The latch L1 performs a latch operation for every GOP, thereby latching the sum of "TGOP" and an output from the latch L2. The latch L2 latches an output from the latch L1 indicative of "TGOP" only when a coding operation for every GOP is begun. The latch L2 also latches the value R obtained by subtracting the number of actually generated bits, genbits, from the GOP bit allocation amount when a coding operation for every picture is completed. Since the latched value in the latch L2 may be a negative number (a 2's complement), the most significant bit thereof is used as a code bit. The enable signal GOPck_d2 for the latch L2 is delayed from the enable signal GOPck_d2 for the latch L1 by one clock.

Figure 5:
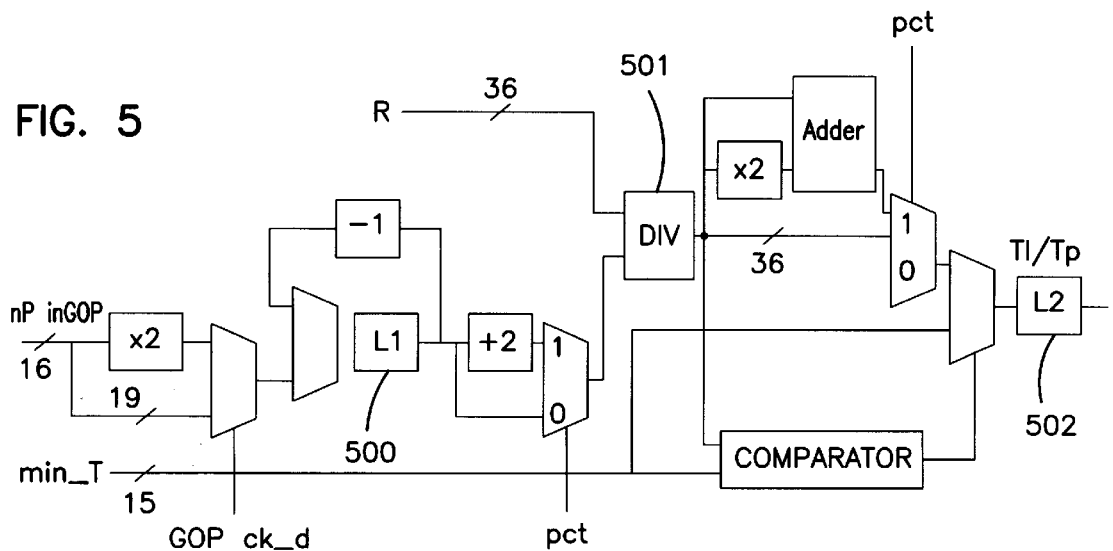
FIG. 5 is a block diagram illustrating a circuit for calculating the bit allocation amounts for I and P-mode pictures in accordance with the present invention.

FIG. 5 is a block diagram illustrating a circuit for calculating the bit allocation amounts for I and P-mode pictures in accordance with the present invention. As in Equations (3) and (4), the bit allocation amounts for I and P-mode pictures, TI and TP are determined in such a manner that "TI" corresponds to about 3 times "TP". When "TI" is less than "$minT_I$" derived by Equation (5), it is set by "$minT_I$". Also, "TP" is set by "$minT_p$" derived by Equation (6) when it is less than "$minT_p$". When a coding operation is begun for every GOP, the value "nPinGOP" is latched in a latch L1 which is denoted by the reference numeral 500 in FIG. 5. The value latched in the latch L1 is then decremented by "1" at every picture clock. A latch L2, which is denoted by the reference numeral 502, is coupled to the latch L1 via a divider 501. The divider 501 has a general divider configuration. The latch L2 latches an output from the divider 501.

Figure 6:
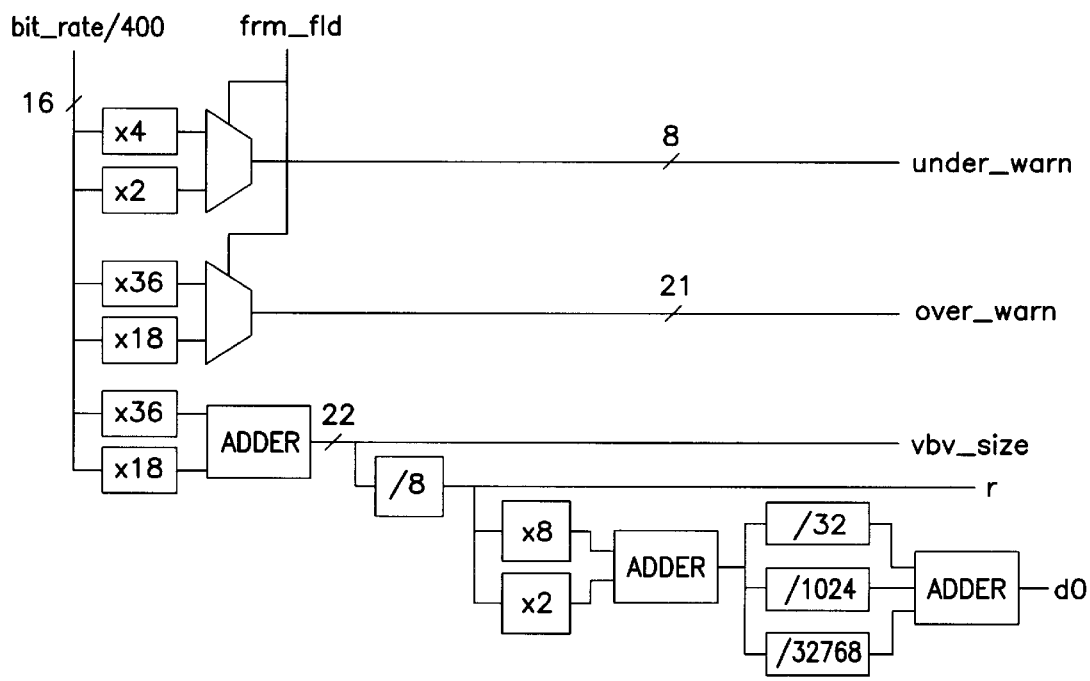
FIG. 6 is a block diagram illustrating a circuit for determining the buffer size, overflow/underflow alarm, and initial parameter value, based on the bit rate, in accordance with the present invention.

FIG. 6 is a block diagram illustrating a circuit for determining the buffer size, overflow/underflow alarm, and initial parameter value, based on the bit rate, in accordance with the present invention. The buffer size is determined to correspond to 1/10 of the transmission capacity. It is also set that an overflow alarm is generated at 9/10 of the buffer size while an underflow alarm is generated at 1/10 of the buffer size.

Figure 7:
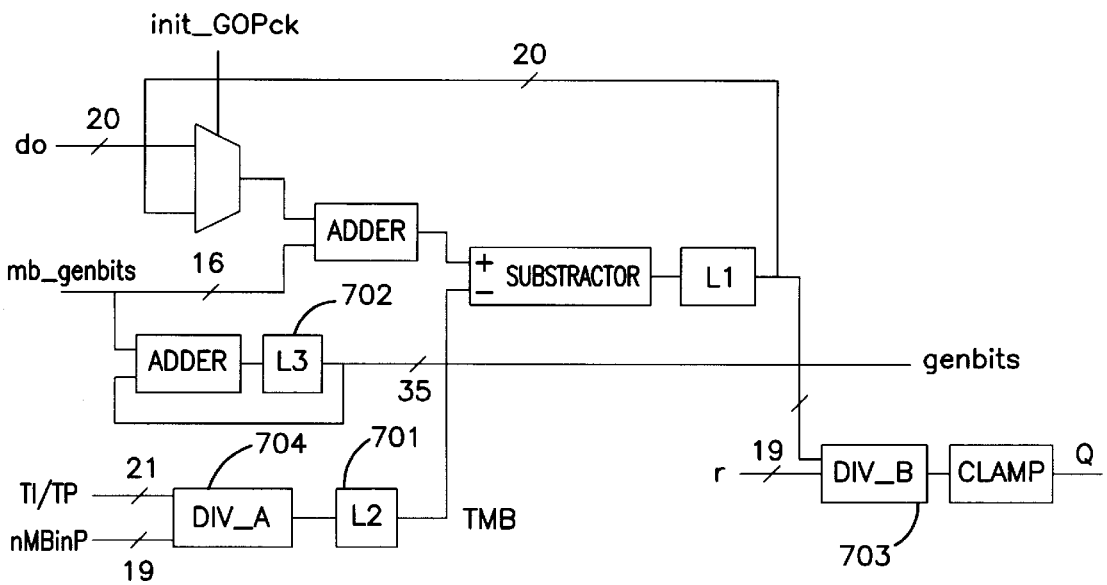
FIG. 7 is a block diagram illustrating a circuit for determining the step size of the quantizer in accordance with the present invention.

FIG. 7 is a block diagram illustrating a circuit for determining the step size of the quantizer in accordance with the present invention. The initial parameter value $d_0$ is selected from a GOP which is initially processed after a reset operation. The amount of bits generated for every macroblock, mb_genbits, are accumulated by a latch L3 after processing every macroblock. The latch L3 is denoted by the reference numeral 702 in FIG. 7. After completing a coding processing for one picture, the value "mb_genbits" corresponds to "genbits". A latch L2, which is denoted by the reference numeral 701, latches the value "TMB" calculated when a coding operation is begun for every picture. A latch L1, which is denoted by the reference numeral 700, is coupled to the latch L2. The latch L1 latches a parameter value for every macroblock which corresponds to the result of Equation (8). The last step size of the quantizer corresponds to the result of a clamping operation for the output from the latch L1 carried out via a divider DIV__B. This step size ranges from "1" to "31". A divider DIV__A is used to calculate the value "TMB" when a coding operation is begun for every picture. On the other hand, the divider DIV__B is used to determine the step size of the quantizer for every macro block. In replace of such dividers, a single divider may used along with a multiplexor and a demultiplexor in a time division manner.

As apparent from the above description, the present invention provides an algorithm for simply and effectively controlling the data bit rate of a DPCM/DCT video encoder and hardware thereof. All video encoders, which utilize a digital video signal band compression, require a bit rate control. Such a bit rate control is an important technique determining the performance of encoders irrespective of a standardization association with the data compression. Accordingly, the present invention can be effectively applied to encoder systems, such as digital televisions, high definition televisions and codec's for B-ISDN communications, utilizing a digital video signal band compression. The hardware according to the present invention can be realized in the form of a field programmable gate array (FPGA) or application specific IC (ASIC), so that it is applied to chips of video encoders according to MPEG or H.261.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling the data bit rate of a differential pulse code modulation/discrete cosine transform (DPCM/DCT) video encoder, comprising the steps of:

determining an initial bit allocation amount for every group of pictures (GOP) of an input video;

allocating bits for every picture of each GOP;

allocating bits for every macroblock of each picture;

determining a quantizer step parameter based on the bit allocation amount, wherein the quantizer step parameter for every macroblock is determined to be proportional to a value obtained after subtracting the accumulated amount of bits allocated for up to the macroblock from the accumulated amount of bits generated for up to the macroblock, and wherein the quantizer step parameter for every macroblock is determined using the following equation:

$$d_j = d_o + \Sigma B_j - \Sigma TMB_j$$

where,

"$d_j$" represents a quantizer step parameter of a j-th macroblock;

"$d_o$" represents an initial value of "$d_j$";

"$\Sigma B_j$" represents the accumulated amount of bits generated for up to the j-th macroblock; and "$\Sigma TMB_j$" represents the accumulated amount of bits allocated for up to the j-th macroblock; and determining a quantizer step proportional to the determined quantizer step parameter.

2. The method in accordance with claim 1, wherein the value "$d_o$" satisfies the following equation:

$$d_o = 10 \cdot r/31$$

where, "r" corresponds to "buffer__size/8" and "buffer__size" represents the size of a buffer used.

3. The method in accordance with claim 1, wherein the quantizer step size for every macroblock is determined using the following equation:

$$Q_j = 31 \cdot d_j / r (r = \text{buffer__size}/8)$$

where, "$Q_j$" represents the quantizer step size for a j-th macroblock, and "buffer__size" represents the size of a buffer used.

4. A method for controlling the data bit rate of a differential pulse code modulation/discrete cosine transform (DPCM/DCT) video encoder, comprising the steps of:

determining an initial bit allocation amount for every group of pictures (GOP) of an input video;

allocating bits for every picture of each GOP;

allocating bits for every macroblock of each picture;

determining a quantizer step parameter based on the bit allocation amount; and determining a quantizer step size proportional to the determined quantizer step parameter, wherein the quantizer step size for every macroblock is determined using the following equation:

$$Q_j = 31 \cdot d_j / r (r = \text{buffer__size}/8)$$

where, "$Q_j$" represents the quantizer step size for a j-th macroblock, and "buffer__size" represents the size of a buffer used.

5. The method in accordance with claim 4, wherein the quantizer step parameter for every macroblock is determined to be proportional to a value obtained after subtracting the accumulated amount of bits allocated for up to the macroblock from the accumulated amount of bits generated for up to the macroblock.

6. The method in accordance with claim 4, wherein the quantizer step parameter for every macroblock is determined using the following equation:

$$d_j = d_o + \Sigma B_j - \Sigma TMB_j$$

where, where, "$d_j$" represents a quantizer step parameter of a j-th macroblock;

"$d_o$" represents an initial value of "$d_j$";

"$\Sigma B_j$" represents the accumulated amount of bits generated for up to the j-th macroblock; and "$\Sigma TMB_j$" represents the accumulated amount of bits allocated for up to the j-th macroblock.

* * * * *